United States Patent [19]

Schall

[11] 4,379,880
[45] Apr. 12, 1983

[54] VINYL HALIDE POLYMER OF ENHANCED PLASTICIZER UPTAKE

[75] Inventor: William L. Schall, Grand Island, N.Y.

[73] Assignee: Occidental Chemical Corporation, Niagara Falls, N.Y.

[21] Appl. No.: 290,127

[22] Filed: Aug. 5, 1981

Related U.S. Application Data

[63] Continuation-in-part of Ser. No. 193,560, Oct. 3, 1980, Pat. No. 4,342,845.

[51] Int. Cl.³ ............... C08F 2/02; C08F 114/06; C08K 5/11
[52] U.S. Cl. .................. 524/297; 526/88; 526/344.1
[58] Field of Search ............... 526/344.1, 88; 260/31.8 R, 31.8 F; 524/297

[56] References Cited

U.S. PATENT DOCUMENTS

| | | | |
|---|---|---|---|
| 3,522,227 | 7/1970 | Thomas | 526/344.1 |
| 3,642,744 | 2/1972 | Moberly et al. | 526/344.1 |
| 3,926,931 | 12/1975 | Koyanagi et al. | 526/88 |
| 4,155,899 | 5/1979 | Lemper et al. | 260/42.53 |
| 4,205,149 | 5/1980 | Cich et al. | 526/344.1 |

FOREIGN PATENT DOCUMENTS 1047489  11/1966  United Kingdom .

Primary Examiner—Stanford M. Levin
Attorney, Agent, or Firm—James F. Tao; James F. Mudd

[57] ABSTRACT

Vinyl halide polymer is prepared by bulk liquid phase polymerization of vinyl halide monomer in the presence of a minor proportion, based on the weight of the polymerization reaction mass, of isobutane diluent followed by application of reduced pressure to remove diluent and unreacted monomer from the polymer.

The product exhibits improved porosity and molten color stability compared to vinyl halide polymers prepared in bulk in the presence of conventional alkane hydrocarbon diluents.

16 Claims, No Drawings

VINYL HALIDE POLYMER OF ENHANCED PLASTICIZER UPTAKE

CROSS-REFERENCE TO RELATED APPLICATION

This application is a continuation-in-part of copending U.S. application Ser. No. 193,560, filed Oct. 3, 1980, U.S. Pat. No. 4,342,845.

The invention relates to an improved process for preparing vinyl halide polymers by bulk liquid phase polymerization. More particularly, it relates to an improved process for preparing such polymers in the presence of a diluent which aids in removal of residual vinyl halide monomer from the polymer. It is especially concerned with a process which employs said diluent to enhance the product porosity and color stability of the molten polymer.

BACKGROUND OF THE INVENTION AND RELATION TO THE PRIOR ART

The polymers of vinyl halide monomer, particularly vinyl chloride, constitute an important group of thermoplastics. Such polymers have been prepared by various techniques including suspension and emulsion mode polymerization. However, the latter modes of polymerization which employ aqueous reaction conditions are meeting increasing competition from the bulk mode of polymerizing vinyl halide which omits the inconvenient aqueous diluent.

A serious problem has recently arisen in product of polyvinyl halide in connection with the discovery that vinyl halide monomers are potential or actual health hazards to humans.

For example in the case of vinyl chloride monomer, recent experiments on animals have indicated that the monomer is carcinogenic. Accordingly, the Federal Government has determined that action should be taken to reduce human exposure to the monomer. Such exposure is a particular serious problem to workers engaged in manufacture of polyvinyl chloride. This is so since the product of the polymerization is a vinyl chloride polymer containing minor amounts, e.g. 100 to 500 parts per million (ppm) of the monomer in a residual free form. The polymer product is obtained as a finely divided resin and the residual monomer will slowly diffuse from the resin as a gas. Such natural diffusion, however, normally requires many days for the monomer content of the product polymer to reach a relatively low level, e.g., less than 50 ppm. During this time, while newly-made polymer is undergoing any manufacturing operations, subsequent to polymerization, workers are exposed to the residual unreacted monomer from the polymer which escapes into the surrounding atmosphere.

To avoid the aforementioned health hazard, there have been devised processes for treating polymerized vinyl halide polymers to remove substantially all of the vinyl halide monomer residue from the polymer.

One such process is described in F. A. Cich U.S. Pat. No. 4,205,149, issued May 27, 1980. According to patentees' process, bulk liquid phase polymerization of vinyl chloride is carried out in the presence of a diluent for the reaction, inter alia an alkane hydrocarbon, e.g. methane, propane, butane, i.e. n-butane, and higher alkanes of straight, branched, or cyclic structure. Upon release of the superatmospheric pressure under which the bulk liquid phase polymerization is carried out, a substantial part of the diluent and unreacted monomer is immediately removed by evaporation from the crude polymer containing reaction mass. The residues of unreacted monomer and diluent in the crude polymer are then removed by a degassing step in which the reaction product is subjected to diminished pressure, e.g. from about 300 mm to about 0 mm, optionally while heating the crude polymer at a moderately elevated temperature, which is below the temperature at which the vinyl halide polymer begins to decompose, e.g. at about 50° to about 85° C.

The foregoing degassing process effectively removes the hazardous residues of the monomer from the polymer to provide a product which contains only about 31 ppm of vinyl halide monomer when the short chain hydrocarbon alkane n-butane is used as diluent in patentees' bulk polymerization process (see Table II, Example 13 of the patent).

It has been found, however, that the aforementioned vinyl halide polymer prepared by bulk liquid phase polymerization in the presence of n-butane according to U.S. Pat. No. 4,205,149 is characterized by relatively poor color stability during the period immediately subsequent to melting. Moreover, while patentees' polymer is characterized by an improved porosity (with respect to the polymer's ability to absorb liquid polyvinyl halide additives, e.g. organic plasticizers) compared to polymer manufactured without the diluent, a further improvement in the aforementioned porosity property would be highly desirable.

SUMMARY OF THE INVENTION

The invention overcomes the aforementioned deficiencies of the prior art to provide a process for degassing polyvinyl halide effectively while improving product porosity and diminished color development in the product immediately after melting.

The invention is directed to an improvement in the process which comprises polymerizing in bulk liquid phase, a reaction charge consisting essentially of a monomer charge consisting of at least 50 weight percent vinyl halide monomer and an ethylenically unsaturated comonomer, copolymerizable therewith, an initiator for the polymerization and a saturated aliphatic hydrocarbon diluent and reducing the pressure of the resultant polymerized reaction mass to separate polymer product from diluent and unreacted monomer.

According to the improvement, the polymerization is carried out using as diluent isobutane in a minor weight proportion based on the weight of the reaction charge.

The process effectively removes hazardous residue of vinyl halide monomer from vinyl halide polymer.

The present process also provides a product which exhibits improved porosity with respect to its ability to absorb a greater amount of plasticizer or other liquid polyvinyl halide adjuvant compared to the corresponding polymer made using the prior art n-butane diluent. More particularly, the present product absorbs about 20% by weight more plasticizer than said corresponding prior art product having a substantially similar bulk density to the present product.

The product of the invention also exhibits less discoloration in the melt (in the period immediately following melting) when compared to the corresponding prior art product made under comparable conditions with n-butane diluent. This property indicates the present product to be of greater color stability on processing in the melt than is the corresponding product made with n-butane diluent.

DETAILED DESCRIPTION OF THE INVENTION

The vinyl halide monomer charged to the bulk liquid phase polymerization of the present invention is preferably vinyl chloride, although other vinyl halides, such as vinyl fluoride and vinyl bromide, can also be employed.

Vinyl chloride like the isobutane diluent is a gas at ambient temperature with vapor pressure characteristics very similar to that of isobutane.

While the monomer compositions charged to present polymerization can be comprised totally of vinyl halide monomer, the present invention is also intended to include copolymers formed by the free-radical addition polymerization of a monomer composition containing a major amount, e.g. at least 50% of vinyl halide, preferably 80% of a vinyl halide and a minor amount, e.g. less than 50% by weight of one or more ethylenically unsaturated monomers copolymerizable with the vinyl halide. Preferably, the other ethylenically unsaturated monomer is used in amounts of less than 20% by weight and more preferably in amounts less than 10% by weight of the total monomer compounds used in preparing the polymer. Suitable ethylenically unsaturated monomer materials which can be used to form base copolymers, terpolymers, interpolymers and the like, are illustrated by the monoolefinic compounds useful as comonomers disclosed in A. L. Lemper et al. U.S. Pat. No. 4,155,899, issued May 22, 1979 at Column 4, lines 65-Column 6, line 1. The disclosure of the latter patent is incorporated herein by reference.

The isobutane diluent is charged to the present polymerization in a minor weight proportion effective to enhance the porosity of the polymer product after degassing. Typically, the proportion of isobutane used is from about 0.1 to less than about 50 weight percent based on the weight of the polymerization reaction mass. Preferably, the proportion of isobutane is about 1 to about 30 weight percent, especially from about 2 to about 20 weight percent. A particularly good result is obtained using a proportion of isobutane of about 3 to about 10 weight percent based on the weight of the polymerization reaction mass.

The present polymerization process is carried out at temperatures between about 25° and about 90°, preferably, about 40° to about 80°, and especially about 50° to about 75° C. The reaction is carried out under an autogenous superatmospheric pressure sufficient to maintain the reaction mass in the liquid state. The polymerization reactions conducted in the presence of a small initiating amount of a free radical initiator for the reaction. Useful free radical initiators are organic or inorganic peroxides, persulfates, oxonates, hydroperoxides, peracids and percarbonates, diazonium salts, diazotates, peroxysulfonates, trialkyl borane-oxygen systems, amine oxides, and organic azo compounds, such as 2,2'-azo-bis-isobutyronitrile and 2,2'-azo-bis-2,4-dimethyl valeronitrile. Preferably, an organic azo compound or an organic peroxy compound, especially an organic peroxide, is used as the initiator. The initiator is used in a concentration ranging from about 0.01 to about 1.0 percent and, preferably, from about 0.05 to about 0.5 percent based on the total weight of all monomers in the reaction mixture. Organic initiators which are soluble in the bulk polymerization mass are especially useful and include the following representative examples: diisononanoyl peroxide, acetyl cyclohexylsulfonyl peroxide, di(2-ethylhexyl)peroxydicarbonate, t-butyl peroxyneodecanoate, lauroyl peroxide, benzoyl peroxide, diacetyl peroxide, azo-bisisobutyronitrile, diisopropyl peroxydicarbonate, azo-bisisobutyramidine hydrochloride, t-butyl peroxypivalate, 2,4-dichlorobenzoyl peroxide, and 2,2'-azo-bis-(2,4-dimethyl valeronitrile). These and other suitable initiators are more particularly described by J. Brandrup and E. H. Immergut, Editors "Polymer Handbook," Interscience Publishers, 1966, Chapter II entitled "Decomposition of Organic Feed Radical Initiators," the pertinent disclosure whereof is incorporated herein by reference. Advantageously, the initiator which is used is chosen from a group of initiators known in the prior art as the "hot catalysts" or those which have a high degree of free-radical initiating activity. Initiators with a lower degree of activity are less desirable in that they require longer polymerization times.

The polymerization process is suitably carried out in a conventional stationary polymerization reaction zone employing therein a conventional, reaction mixture-inert agitator, i.e. an agitation body, such as a turbine, propeller, impeller, stirring paddle, screw, bar or blade. Such agitation body or bodies are movable, but are not freely movable in the polymerization reaction zone.

This is so since the agitation body or bodies are movable only in direct response to an agitator motor means, e.g. a variable speed conventional agitator motor, the agitation body or bodies being connected thereto by a linking means, such as a mechanical drive shaft, a magnetic field or the like, which connection limits the movement of the agitation body within the stationary reaction zone. Such limitation of movement of the agitator is highly desirable, since it substantially avoids undesirable impact of the agitatory body against the reactor wall as in moving reactor processes.

The present polymerization process may be carried out in one or more stages. The present process is preferably carried out using a two-stage liquid phase bulk polymerization process involving high speed agitation during a first stage in which about 3 to about 20 percent, preferably about 3 to about 15 percent, more preferably about 7 to about 12 percent, by weight of the monomer or monomers are converted to polymer with subsequent polymerization in a second stage involving low speed agitation for the remainder of the reaction.

In the aforementioned preferred two-stage reaction configuration employed in the present bulk liquid phase process, the means chosen to agitate the monomer or monomers in the first stage is of a type capable of providing high shear agitation and is commonly referred to as a "radical turbine type" agitator. The speed of the turbine type agitator generally lies between 500 and 2000 revolutions per minute or a tip speed of about 2 to 7 meters per second in the first stage reactor. An agitator tip speed of about 0.05 to about 2 meters per second is used in the second reactor stage. These figures should not be regarded as limiting values.

The aforementioned two-stage polymerization processes and equipment are described in British Pat. No. 1,047,489 and U.S. Pat. No. 3,522,227, the teachings of which are hereby incorporated herein by reference.

The polymer is recovered from the polymerization reaction vessel by conventional means and separated from residual unreacted vinyl halide monomer and isobutane diluent contained in the recovered product by the procedure of the aforementioned Cich et al. patent in particular using the temperature and pressure conditions for the degassing step presented at Column 3, lines 17-22 and at Column 3, lines 31-33 of the patent. The disclosure of the Cich et al. patent is incorporated herein by reference. In accordance with the product degassing procedure of the present invention, it is highly desirable to follow application of vacuum to the product at elevated temperature as in the Cich et al. patent, with application of vacuum to product at a subambient temperature, e.g. 0° to 20°.

By carrying out the procedure of the invention, degassed vinyl halide polymers having a concentration of vinyl halide monomer as low as about 30 ppm or lower can be obtained.

The present product has an enhanced porosity with respect to absorption of conventional plasticizers.

As shown in the porosity results in Examples I–IV below, when treated with a liquid plasticizer compatible with polyvinyl halide (for example di(2-ethyl hexyl) phthalate and other plasticizers disclosed at Table 5.5, page 63 of P. D. Richie Ed. "Plasticizers, Stabilizers and Fillers," Iliffe Book Ltd., 1972, the subject matter of which is incorporated herein by reference), the present product absorbs substantially larger quantities of plasticizer to form flexible polyvinyl halide than does the corresponding polymer prepared without a diluent. The results of these tests indicate that the present product is also more susceptible to absorption of other liquid adjuvants conventionally added to polyvinyl halide, e.g. liquid stabilizers, lubricants, and the like.

In addition to admixing the present product with the aforementioned additives, the product may be admixed with other conventional additives such as fillers, dyes and pigments (as well as with the aforementioned types of additives which are normally solids).

In order to further illustrate the invention but without being limited thereto, the following examples are given. In this specification and claims, unless otherwise indicated, parts, percentages, ratios, and proportions are by weight, and temperatures are in degrees centigrade.

EXAMPLE 1

A 2.5 gallon first stage polymerization reaction vessel which is equipped with a turbine-type high speed agitator and is free of air is charged with a mixture of 2270 g. of vinyl chloride monomer and about 5%±1% isobutane diluent (based on the combined weight of diluent and monomer), 2 ml. of a proprietary 75% solution of di(2-ethyl hexyl) peroxydicarbonate initiator in odorless mineral spirits manufactured under the name Lupersol 223 M 75 by Lucidol Div. of Pennwalt Corp., 0.1 g. of 2,6-di-tert. butyl p-cresol antioxidant, 1.9 ml. of odorless mineral spirit (as solubilizing agent for the latter antioxidant), 0.1 ml. of epoxidized soybean densifier and 57 microliters of 70% aqueous nitric acid. The reaction vessel is sealed and the reaction mass is heated at about 66° under an autogenous reaction pressure of about 167 psig. for 25 minutes, employing an agitator speed of 1500 rpm.

The polymerization reaction mass is then transferred under pressure to a second stage 10-gallon reaction vessel which is equipped with a spiral agitator operating at a slow agitation speed of 60 rpm and which contains at 15°, 2270 g. of additional vinyl chloride monomer, 6.0 ml. of a proprietary 75% solution of tertiary butyl peroxy neodecanoate initiator in odorless mineral spirits manufactured under the name Lupersol 10M75 by Lucidol Div. of Pennwalt Corp., 4.1 g. of lauroyl peroxide initiator, 1.0 ml of di(2-ethyl hexyl) peroxydicarbonate initiator employed in the first reaction stage, and 0.8 g. of the antioxidant charged to the first stage reactor. The first stage reaction vessel is then flushed for 3 minutes with 908 g. of vinyl chloride monomer at 70°, and the vinyl chloride flushing is added to the mixture in the second stage reaction vessel. The sealed second stage reaction vessel is then heated for four hours at about 68° under an autogenous reaction pressure of about 175 psig. The pressure in the second stage reactor is then adjusted to atmospheric pressure to remove diluent and unreacted vinyl chloride (overhead in the reactor to the polymerized product) to a vinyl chloride monomer recovery system. The reactor is re-pressurized at 70° to 200 psig with nitrogen and the resultant gaseous mixture of nitrogen, diluent and unreacted monomer is vented to the aforementioned recovery system. The resultant polymer product is then degassed for one hour (to remove diluent and unreacted monomer residues in the polymer) by being heated at 70° under a subatmospheric pressure of about 125 mm. of mercury. The polymer product is further degassed for an additional hour at 0° at the aforementioned subatmospheric pressure.

The degassed polymer is discharged from the second stage reactor, weighed to determine product yield and percent conversion of monomer to polymer, and screened to determine percent scale, percent product particles greater than 40 mesh (US Seive Series) size, and percent product particles less than 40 mesh size. Also measured are the product bulk density, number average molecular weight ($\overline{M}_n$) weight average molecular weight ($\overline{M}_w$), polydispersity ($\overline{M}_w/\overline{M}_n$), and the Hunter color scale parameters L, a and b of the product using a Hunter colorimeter. The ease of cleaning the reaction vessels after polymerization is also estimated.

A sample of the product is tested for the amount in parts per million (ppm) of vinyl chloride monomer in the polymer by vapor phase chromatography. The sample is then heated at 100° for 30 minutes with air being drawn through the heated sample. The vinyl chloride residue concentration in the resultant cooled product is again measured by vapor phase chromatrography. The foregoing procedure is then twice repeated to obtain residual vinyl chloride monomer concentration in the product after 60 minutes and 90 minutes. The ratio of the original residual vinyl chloride monomer concentration in the product, i.e., prior to any heating at 100°, to the ratio of residual vinyl chloride monomer concentration in the product after 60 minutes is the degassability of the product, a measure of the ease of degassing residual vinyl chloride monomer from the product.

The porosity of the product is measured by centrifugal mixing of 0.5 g. of the product with 1 ml. of di(2-ethyl hexyl), phthalate plasticizer, i.e., excess plasticizer, for 40 minutes at room temperature and determining the grams of plasticizer absorbed by 100 g. of the polymer. The resultant porosity is a measure of the ease of uptake by the product polymer of liquid plasticizer as well as other conventional liquid additives such as lubricants, thermal stabilizers and the like.

A 55 g. sample of the product is also tested for stability in the molten state in a Brabender Plastograph apparatus. The Brabender fusion time, maximum fusion torque, equilibrium torque, decomposition time and color chip decomposition time are measured in a Brabender Plastograph operating at 204° with a rotor speed of 63 rpm.

In a separate Brabender Plastograph experiment under similar conditions, samples of molten product in the Brabender Plastograph bowl are taken at 2, 4, 6, 8, 10, 15, 20, 25 and 30 minute intervals subsequent to melting of the product in the Brabender bowl.

The samples are allowed to cool to ambient temperature and any discoloration in the samples is noted. The results of this Example are presented in the Table below.

EXAMPLE II (Comparative Example)

The bulk liquid phase polymerization procedure of Example I is repeated substantially as described except that n-butane is employed as the polymerization diluent in place of isobutane. The product is tested substantially as described in Example I. The results of this Example are compared with those of Example I in the Table below.

EXAMPLE III

The procedure of Example I is repeated substantially as described except that the amount of the di(2-ethyl hexyl) peroxydicarbonate initiator used in the first stage reactor is increased to 2.3 ml. and in the second stage reactor, the concentration of the tert-butyl peroxyneodecanoate, lauroyl peroxide and di(2-ethyl hexyl) peroxydicarbonate initiators are increased to 6.8 ml., 4.7 g. and 1.1 ml., respectively. The amounts of initiators used are increased to provide a bulk liquid phase vinyl chloride homopolymerization example using isobutane as diluent wherein the percent conversion of monomer to polymer is more nearly about the same as the percent conversion in Example II.

The data of this Example is compared with that of Examples I and II in the Table below.

EXAMPLE IV (Control)

In this example, the procedure of Example I is repeated substantially as described except that the amount of the di(2-ethyl hexyl) peroxydicarbonate initiator charged to the second stage reactor is 2 ml. and no diluent is charged to the vinyl chloride bulk liquid phase polymerization. The weight recovery of product, the percent conversion and porosity of this product are compared with the corresponding data of Examples I-III in the Table below. The particle distribution of this product is comparable to that of the Example I and Example II products.

TABLE

| | Example I | Example II | Example III | Example IV |
|---|---|---|---|---|
| Diluent: | Isobutane | n-butane | Isobutane | None |
| Recovery (g) | 4767 | 6084 | 5857 | 6174 |
| % Conversion | 52 | 67 | 64.5 | 68.4 |
| % Scale | 13.4 | 10.5 | 15.6 | — |
| % > 40 MESH | 38.4 | 24.5 | 19.0 | — |
| % < 40 MESH | 48.8 | 65.1 | 65.4 | — |
| Bulk Density | 0.467 | 0.498 | 0.485 | — |
| $\overline{M}n$ | 21,300 | 21,767 | 20,467 | — |
| $\overline{M}w$ | 52,433 | 50,900 | 51,733 | — |
| $\overline{M}w/\overline{M}n$ | 2.46 | 2.35 | 2.52 | — |
| Hunter Color: | | | | |
| L | 94.6 | 95.5 | 96.2 | — |
| a | −.6 | −.5 | −.6 | — |
| b | −.5 | −.2 | .5 | — |
| 0 Min. ppm vinyl chloride | 30.24 | 32.3 | 45.5 | — |
| 30 Min. ppm vinyl chloride | 4.36 | 0.35 | 2.03 | — |
| 60 Min. ppm vinyl chloride | 0.41 | 0.013 | 0.432 | — |
| 90 Min. ppm vinyl chloride | 0.088 | 0.004 | 0.164 | — |
| Degassability (0 Min. vinyl chloride ppm/ 60 Min. vinyl chloride ppm) | 94.7 | 3179 | 198.5 | — |
| Porosity (g. plasticizer per 100 g. polymer) | 25.6 | 21.4 | 25.7 | 15.1 |
| Fusion Time (seconds) | 15 | 11.7 | 11.7 | — |
| Maximum Fusion Torque (m.-g.) | 3142 | 3392 | 3288 | — |
| Equi. Torque (m.-g.) | 604 | 612.3 | 651 | — |
| Decomposition Time (minutes) | 14.25 | 14.50 | 15.00 | — |
| Color Chip Decomposition Time (minutes) | 16.8 | 16.4 | 17.4 | — |

Note:
(1) The color of sample taken from the Brabender Plastograph is less in Example I than in Example II.
(2) Example I, Example II and Example III, for each property, data is average of three separate equivalent determinations. Example IV, for each property, data is average of two separate determinations.
(3) The reactor scale formed in Examples I-III is about equivalent so that the ease of cleaning the reactors in these Examples is about the same.

While this invention has been described with reference to certain specific embodiments, it will be recognized by those skilled in the art that many variations are possible without departing from the spirit and scope of the invention.

For example, instead of using pure isobutane as the diluent, isobutane containing a minor weight proportion, e.g. ten weight percent or less, based on total diluent, of an alkane hydrocarbon having a normal boiling point lower than vinyl chloride monomer, may be employed, for example ethane or propane.

What is claimed is:

1. A process for preparing a vinyl chloride polymer which comprises (a) polymerizing a reaction charge in bulk liquid phase in the presence of a polymerization initiator and an inert diluent consisting essentially of isobutane in an amount from about 0.1 to less than 50 weight percent of the reaction charge, said charge comprising vinyl chloride as the sole polymerizable monomer and (b) reducing the pressure on the resultant polymerized reaction charge to separate polymer product from diluent and unreacted monomer.

2. The process of claim 1 wherein the proportion of the isobutane is from about 1 to about 30 weight percent.

3. The process of claim 2 wherein the proportion of isobutane is from about 2 to about 20 weight percent.

4. The process of claim 3 wherein the proportion of isobutane is from about 3 to about 10 weight percent.

5. The process of claim 1 wherein the separation of the isobutane and the unreacted monomer comprises reducing the pressure on the polymerized reaction mass to a subatmospheric pressure of from about 300 to about 0 mm of mercury to remove the isobutane and unreacted monomer and recovering the polymeric product substantially free of the monomer and the isobutane.

6. The process of claim 5 wherein the monomer charge consists of vinyl chloride.

7. The process of claim 1 wherein the polymerization is conducted in two reaction stages employing high speed agitation of the polymerization reaction mass in the first reaction stage until a conversion of monomer charge to polymer of about 3 to 20 percent is obtained and subsequently completing the polymerization in a second reaction stage using slow speed agitation of the polymerization reaction mass.

8. The process of claim 7 wherein the proportion of the isobutane is from about 1 to about 30 weight percent.

9. The process of claim 8 wherein the proportion of the isobutane is from about 2 to 20 weight percent and the reduced pressure applied to the polymerized reaction mass is from about 300 mm to above about 0 mm.

10. The process of claim 9 wherein the proportion of the isobutane is about 3 to 10 weight percent.

11. The polymer product of the process of claim 1.

12. The product of claim 11 containing a liquid organic plasticizer for vinyl halide polymer.

13. The product of claim 12 wherein the plasticizer is di(2-ethyl hexyl) phthalate.

14. The polymer product of the process of claim 7.

15. The product of claim 14 containing a liquid organic plasticizer for vinyl halide polymer.

16. The product of claim 15 wherein the plasticizer is di(2-ethyl hexyl)phthalate.

* * * * *